(12) United States Patent
Aizawa

(10) Patent No.: US 10,518,606 B2
(45) Date of Patent: Dec. 31, 2019

(54) VEHICLE AIR-CONDITIONING UNIT

(71) Applicant: DENSO CORPORATION, Kariya, Aichi-pref. (JP)

(72) Inventor: Hideo Aizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 276 days.

(21) Appl. No.: 15/525,085

(22) PCT Filed: Dec. 1, 2015

(86) PCT No.: PCT/JP2015/005963
§ 371 (c)(1),
(2) Date: May 8, 2017

(87) PCT Pub. No.: WO2016/088361
PCT Pub. Date: Jun. 9, 2016

(65) Prior Publication Data
US 2017/0320370 A1    Nov. 9, 2017

(30) Foreign Application Priority Data

Dec. 5, 2014   (JP) ................. 2014-246955

(51) Int. Cl.
*B60H 1/00* (2006.01)
*F24F 13/02* (2006.01)

(52) U.S. Cl.
CPC ....... *B60H 1/00564* (2013.01); *B60H 1/0005* (2013.01); *B60H 1/00514* (2013.01);
(Continued)

(58) Field of Classification Search
CPC ............ B60H 1/00514; B60H 1/00564; B60H 1/0005; B60H 2001/00092; B60H 2001/00635; F24F 13/02
See application file for complete search history.

(56) References Cited

U.S. PATENT DOCUMENTS 4,828,018 A * 5/1989 Hoffman ............ B60H 1/00007
165/42
5,062,352 A * 11/1991 Ostrand ............. B60H 1/00057
165/42

(Continued)

FOREIGN PATENT DOCUMENTS

EP     1522434 A1 *  4/2005 ......... B60H 1/00028
JP     S60121910 U     8/1985
(Continued)

*Primary Examiner* — Steven S Anderson, II
(74) *Attorney, Agent, or Firm* — Harness, Dickey & Pierce, P.L.C.

(57) ABSTRACT

A vehicle air-conditioning unit includes an air-conditioning case, a heater, and an opening-closing device. The air-conditioning case includes a first air passage, a second air passage and a third air passage provided in parallel with each other. The heater is provided in the third air passage and heating the air flowing in the third air passage. The opening-closing device opens and closes the third air passage on a downstream side of the heater. The third air passage includes an opening hole that is an opening end of the third air passage on an upstream side of the heater, and the air-conditioning case includes a hole separation portion dividing the opening hole of the third air passage into a plurality of separation holes.

7 Claims, 7 Drawing Sheets

(52) U.S. Cl.
CPC .... *F24F 13/02* (2013.01); *B60H 2001/00092* (2013.01); *B60H 2001/00635* (2013.01)

(56) References Cited

U.S. PATENT DOCUMENTS

| | | | |
|---|---|---|---|
| 5,950,711 A | 9/1999 | Bendell | |
| 6,278,083 B1* | 8/2001 | Schwarz | B60H 1/0005 219/202 |
| 6,823,935 B1* | 11/2004 | Arold | B60H 1/00064 165/103 |
| 2005/0269071 A1* | 12/2005 | Simmet | B60H 1/0005 165/202 |
| 2006/0060341 A1 | 3/2006 | Maehata | |
| 2012/0247747 A1* | 10/2012 | DiGasbarro | B60H 1/00028 165/204 |
| 2015/0217629 A1* | 8/2015 | Kawanishi | B60H 1/241 454/152 |
| 2016/0325599 A1* | 11/2016 | Wang | B60H 1/00564 |
| 2017/0210197 A1* | 7/2017 | Lewczynski | B60H 1/00564 |
| 2018/0141404 A1* | 5/2018 | Yeon | B60H 1/00064 |
| 2018/0162190 A1* | 6/2018 | Hensler | B60H 1/0005 |
| 2018/0236846 A1* | 8/2018 | Stander | B60H 1/00978 |
| 2018/0298914 A1* | 10/2018 | Nakamura | F04D 25/166 |
| 2018/0370334 A1* | 12/2018 | Matsunaga | B60H 1/00 |

FOREIGN PATENT DOCUMENTS

| | | |
|---|---|---|
| JP | S61152509 U | 9/1986 |
| JP | H09132024 A | 5/1997 |
| JP | H10147129 A | 6/1998 |
| JP | 10220858 * | 8/1998 |
| JP | 2006015842 A | 1/2006 |
| JP | 2006056379 A | 3/2006 |
| JP | 2006103664 A | 4/2006 |
| JP | 2007203888 A | 8/2007 |

\* cited by examiner

US 10,518,606 B2

VEHICLE AIR-CONDITIONING UNIT

CROSS REFERENCE TO RELATED APPLICATIONS

This application is a U.S. National Phase Application under 35 U.S.C. 371 of International Application No. PCT/JP2015/005963 filed on Dec. 1, 2015 and published in Japanese as WO 2016/088361 A1 on Jun. 9, 2016. This application is based on and claims the benefit of priority from Japanese Patent Application No. 2014-246955 filed on Dec. 5, 2014. The entire disclosures of all of the above applications are incorporated herein by reference.

TECHNICAL FIELD

The present disclosure relates to a structure of a vehicle air-conditioning unit blowing a conditioned air into a vehicle compartment.

BACKGROUND ART

This kind of a vehicle air-conditioning unit includes a heating heat exchanger disposed in an air-conditioning case, and a temperature of a blown air blown from the vehicle air-conditioning unit is adjusted by adjusting a ratio of an air flowing to the heating heat exchanger to an air bypassing the heating heat exchanger. For example, it is preferred that the blown air is blown without being heated by the heating heat exchanger during a max cool time (MAX COOL TIME), however, it may be difficult that the air bypasses the heating heat exchanger to flow in the air-conditioning case without any effects of heat of the heating heat exchanger. Therefore, in the vehicle air-conditioning unit, a cool air may be reheated by heat of the heating heat exchanger.

For example, since a cooling heat exchanger and the heating heat exchanger are provided adjacent to each other according to a downsizing of the vehicle air-conditioning unit, a technology for reducing the reheat caused by the heating heat exchanger is important. Various kinds of the technology for reducing the reheat have been proposed conventionally, and a vehicle air-conditioning unit described in Patent Document 1 is one example of that.

The vehicle air-conditioning unit of the Patent Document 1 includes an air-conditioning case, a heating heat exchanger, a rotary door having an axis portion, a door portion and a support portion, and a reheat limiting door connected to the rotary door through a hinge portion. The reheat limiting door is located upstream of the heating heat exchanger and moves between a position for fully opening an airflow passage flowing to the heating heat exchanger and a position for fully closing the airflow passage according to a rotation of the rotary door.

The above-described vehicle air-conditioning unit of Patent Document 1 is capable of reducing the reheat caused by the heating heat exchanger, but a movable mechanism that is the reheat limiting door is necessary for reducing the reheat, and accordingly it makes a structure of the vehicle air-conditioning unit complex.

PRIOR ART DOCUMENT

Patent Document

[Patent Document 1] JP Patent No. 2006-103664 A

SUMMARY OF THE INVENTION

It may be considered that a flow rate of the cool air flowing to the heater is reduced by making small an opening area of a passage for flowing the air to the heater that is the above-described heating heat exchanger without the reheat limiting door of the vehicle air-conditioning unit of Patent Document 1.

However, the smaller the opening area for flowing the air to the heater is, the more the amount of the air flowing to the heater is limited and reduced, and accordingly this may be a problem in saving energy and in improving a cooling performance of the vehicle air-conditioning unit.

In consideration of the above-described points, the objective of the present disclosure is to provide a vehicle air-conditioning unit capable of limiting a reheat caused by a heater with a simple structure and easily capable of flowing an enough amount of an air to the heater.

A vehicle air-conditioning unit according to an aspect of the present disclosure includes: an air-conditioning case including a first air passage, a second air passage connected to the first air passage, an air flowing from the first air passage to the second air passage, and a third air passage connected to the first air passage in parallel with the second air passage and joined together with the second air passage on a downstream side in an airflow, the air flowing from the first air passage to the third air passage; a heater provided in the third air passage and heating the air flowing in the third air passage; and an opening-closing device opening and closing the third air passage on one of an upstream side and the downstream side of the heater. The third air passage includes an opening hole that is an opening end of the third air passage on another of the upstream side and the downstream side of the heater, and the air-conditioning case includes a hole separation portion dividing the opening hole of the third air passage into a plurality of separation holes.

According to this, a reheat by the heater can be limited with a simple structure. Moreover, an enough amount of the air can easily flow to the heater.

EMBODIMENTS FOR EXPLOITATION OF THE INVENTION

Figure 1:
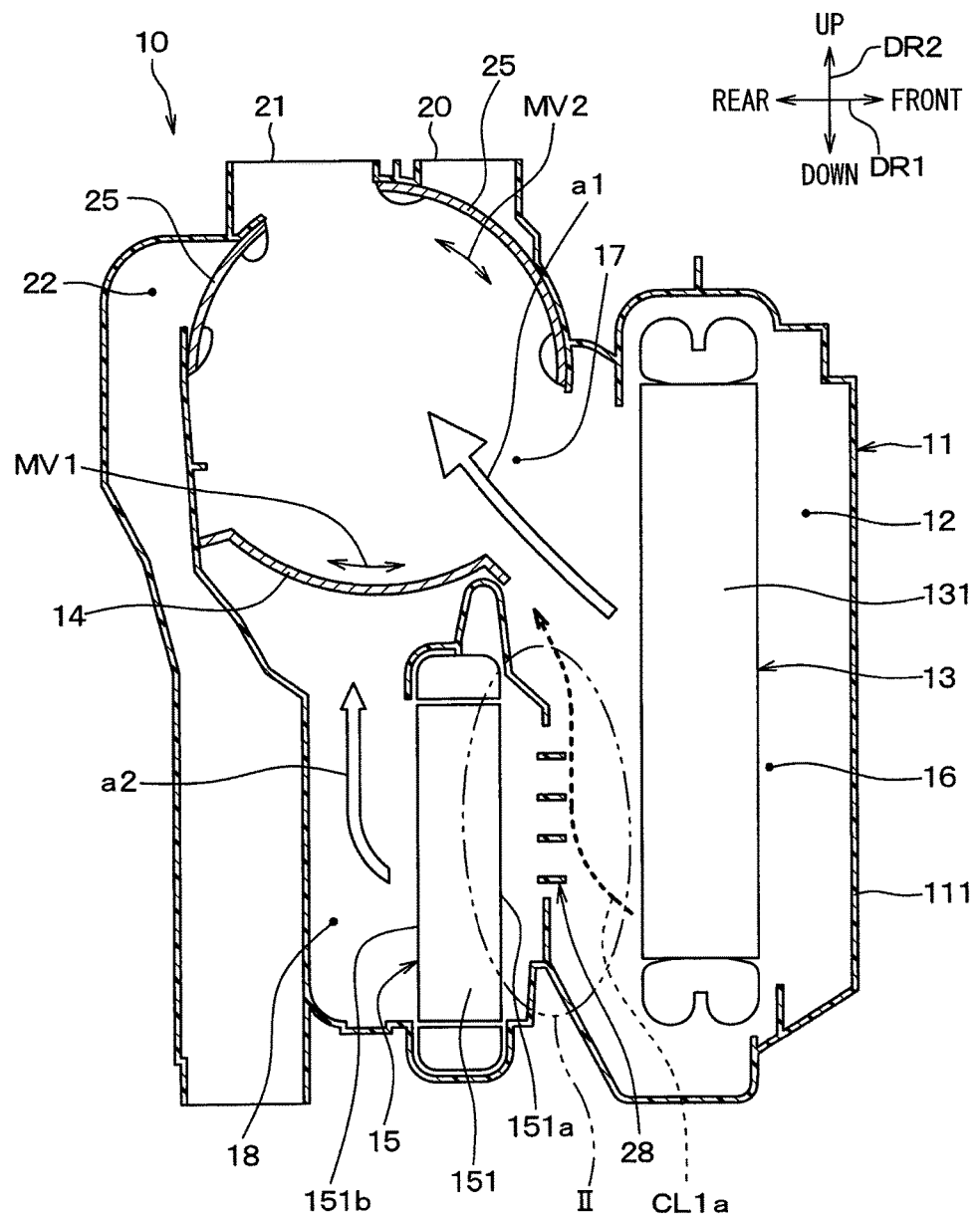
FIG. 1 is a longitudinal section illustrating a vehicle air-conditioning unit according to a first embodiment of the present disclosure.

Embodiments of the present disclosure will be described below with reference to the drawings. In the following respective embodiment, parts identical with or equivalent to each other are denoted by the same symbols in the drawings.

First Embodiment

FIG. 1 is a longitudinal section illustrating a vehicle air-conditioning unit 10 (hereinafter, just referred to as air-conditioning unit 10) of an interior unit portion that is a part of a vehicle air-conditioning device having a refrigeration cycle including a compressor and a condenser provided in an engine room, for example, the vehicle air-conditioning unit 10 accommodating a heat exchanger portion. Arrows DR1, DR2 of FIG. 1 indicate directions in a vehicle mounted state where the air-conditioning unit 10 is mounted in a vehicle. A both ends arrow DR1 of FIG. 1 indicates a front-rear direction DR1 of the vehicle, and a both ends arrow DR2 indicates an up-down direction DR2 of the vehicle. A both ends arrow DR3 of FIG. 3 described below indicates a left-right direction of the vehicle, i.e. a width direction DR3 of the vehicle. The directions DR1, DR2, DR3 are perpendicular to each other.

The air-conditioning unit 10 is located at an approximately center position in the left-right direction of the vehicle, i.e. the width direction of the vehicle, inside a dashboard panel located in a front part of a vehicle compartment that is not shown in the drawings. The above-described interior unit parts of the vehicle air-conditioning device are roughly divided into the air-conditioning unit 10 shown in FIG. 1 and a blowing unit that is not shown in the drawings and offset to a front passenger seat side in the dashboard panel.

As generally known, the blower unit is includes an inside/outside air switching box introducing an outside air that is an air outside the vehicle and an inside air that is an air inside the vehicle, and a centrifugal blower blowing the air introduced in the inside/outside air switching box. The blown air in the blower unit flows into an air inflow space 12 located in a front part of an air-conditioning case 11 of the air-conditioning unit 10 shown in FIG. 1.

As shown in FIG. 1, the air-conditioning unit 10 includes the air-conditioning case 11, an evaporator 13, an air mix door 14, a heater core 15, and an air blowing mode door 25, for example. The air-conditioning case 11 defines a passage of the air flowing into the vehicle compartment and accommodates the evaporator 13, the air mix door 14, the heater core 15, and the air blowing mode door 25.

The air-conditioning case 11 is made of a resin having a certain level of elasticity and superior in a physical strength such as polypropylene. The air-conditioning case 11 is formed by integrating multiple divided cases after forming multiple divided cases because of a reason for cutting during forming and a reason for mounting of air-conditioning devices to the air-conditioning case 11, for example. Accordingly, in the air-conditioning case 11, multiple case part members 111 are integrated to each other.

In the air-conditioning case 11, multiple air passages 16, 17, 18 are defined, into which the air flowing from the air inflow space 12 flows. In detail, an upstream passage 16 that is a first air passage, a cool air passage 17 that is a second air passage, and a hot air passage 18 that is a third air passage are formed in the air-conditioning case 11. The upstream passage 16 is positioned upstream of the cool air passage 17 and the hot air passage 18 in regard to the airflow, and the air flowing from the air inflow space 12 flows into the upstream passage 16.

The cool air passage 17 is an air passage for flowing the cool air that has passed through the upstream passage 16 in a state where the cool air is kept cool, and the cool air passage 17 is connected to the upstream passage 16. The air that has passed through the upstream passage 16 flows into the cool air passage 17 from the upstream passage 16.

The hot air passage 18 is an air passage for heating the air that has passed through the upstream passage 16, and the hot air passage 18 is connected to the upstream passage 16 in parallel to the cool air passage 17. The air that has passed through the upstream passage 16 flows into the hot air passage 18 from the upstream passage 16. The hot air passage 18 is joined together with the cool air passage 17 on a downstream side in regard to the airflow.

As generally known, a low pressure refrigerant decompressed by a decompression device such as an expansion valve of a refrigerant cycle for a vehicle air-conditioning flows into the evaporator 13, and the low pressure refrigerant absorbs heat from the blown air and evaporates, and accordingly the evaporator 13 cools the air passing through the evaporator 13. The evaporator 13 is provided in the upstream passage 16. The evaporator 13 works as a cooling device that cools the blown air flowing in the upstream passage 16, and the evaporator 13 is positioned upstream of both the cool air passage 17 and the hot air passage 18 in regard to the airflow.

The evaporator 13 is positioned at a rear part of the air inflow space 12 in the air-conditioning case 11 of the air-conditioning unit 10, and the evaporator 13 is longitudinally arranged in the up-down direction DR2 of the vehicle. In other words, the evaporator 13 is longitudinally arranged such that an air inflow surface and an air outflow surface of a core portion 131 included in the evaporator 13 extend in the up-down direction.

The heater core 15 heats the air by using a hot water that is a cooling water for a vehicle engine as a heat source, as generally known. The heater core 15 is a hot water type heater heating the air cooled by the evaporator 13. That is, the heater core 15 is disposed in the hot air passage 18 to heat the air flowing in the hot air passage 18.

The heater core 15 has a core portion 151 in which the air passes and is heated, and the core portion 151 includes an air inflow surface 151a into which the air flows and an air outflow surface from which the air flows. The heater core 15 is longitudinally arranged such that the air inflow surface 151a and the air outflow surface 151b extend in the up-down direction DR2 of the vehicle.

The air mix door 14 is a rotary type door rotating about a door axis extending in the width direction DR3 of the vehicle as indicated by an arrow MV1, and the air mix door 14 is rotated by an actuator, for example. The air mix door 14 is positioned downstream of the heater core 15 in regard to the air.

In detail, the air mix door 14 adjusts opening degrees of the cool air passage 17 and the hot air passage 18 in accordance with the rotation position of the air mix door 14. The air mix door 14 adjusts a temperature of the air blown into the vehicle compartment by adjusting a flow rate of the air flowing in the cool air passage 17 indicated by an arrow a1 and a flow rate of the air flowing in the hot air passage 18 indicated by an arrow a2.

Specifically, the air mix door 14 moves within a range from a max cool position, i.e. MAX COOL position, in which the cool air passage 17 is fully opened and the hot air passage 18 is fully closed to a max hot position, i.e. MAX HOT position, in which the cool air passage 17 is fully closed and the hot air passage 18 is fully opened. Accordingly, the air mix door 14 works as an opening-closing device that opens and closes the hot air passage 18 on the downstream side of the heater core 15, and the air mix door 14 works as an opening-closing device that opens and closes the cool air passage 17. In FIG. 1, the air mix door 14 at the max cool position is illustrated.

A defroster opening portion 20 opens in a front part of the vehicle in an upper surface portion of the air-conditioning case 11, and a face opening portion 21 opens in a rear part of the vehicle in the upper surface portion of the air-conditioning case 11. A foot opening portion 22 is provided on a rear part side of the vehicle of the face opening portion 21.

The defroster opening portion 20 is an opening for blowing the conditioned air provided by mixing the air from the cool air passage 17 and the air from the hot air passage 18 toward an inner surface of a windshield of the vehicle. The face opening portion 21 is an opening for blowing the conditioned air to a head and a chest of a passenger. The foot opening portion 22 is an opening for blowing the conditioned air to a foot of the passenger in the vehicle compartment.

The air blowing mode door 25 is a rotary type door rotating, as indicated by an arrow MV2, about a door axis that is the door axis of the air mix door 14, and the air blowing mode door 25 is rotated by an actuator such as a servomotor. The air blowing mode door 25 selectively opens and closes the defroster opening portion 20, the face opening portion 21 and the foot opening portion 22 in accordance with a position of the air blowing mode door 25. The blowing mode door 25 and the air mix door 14 move separately.

A blowing mode of the air blowing mode door 25 can be switched to a face mode, a bi-level mode, a foot mode, a foot-defroster mode, and a defroster mode. In FIG. 1, the air blowing mode door 25 in a state where the blowing mode is the face mode is illustrated.

Figure 2:
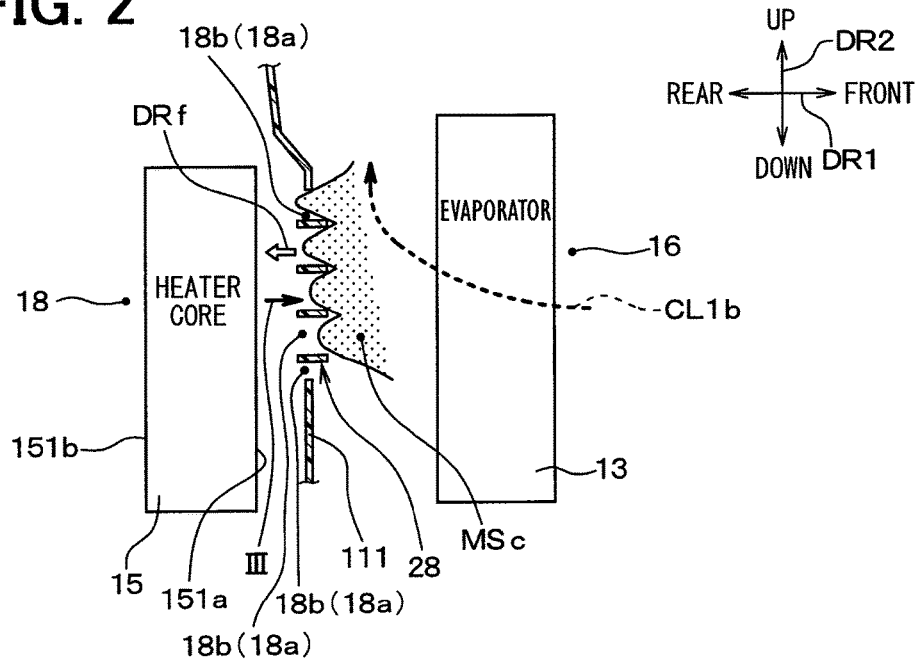
FIG. 2 is a sectional diagram illustrating II part of FIG. 1.
Figure 3:
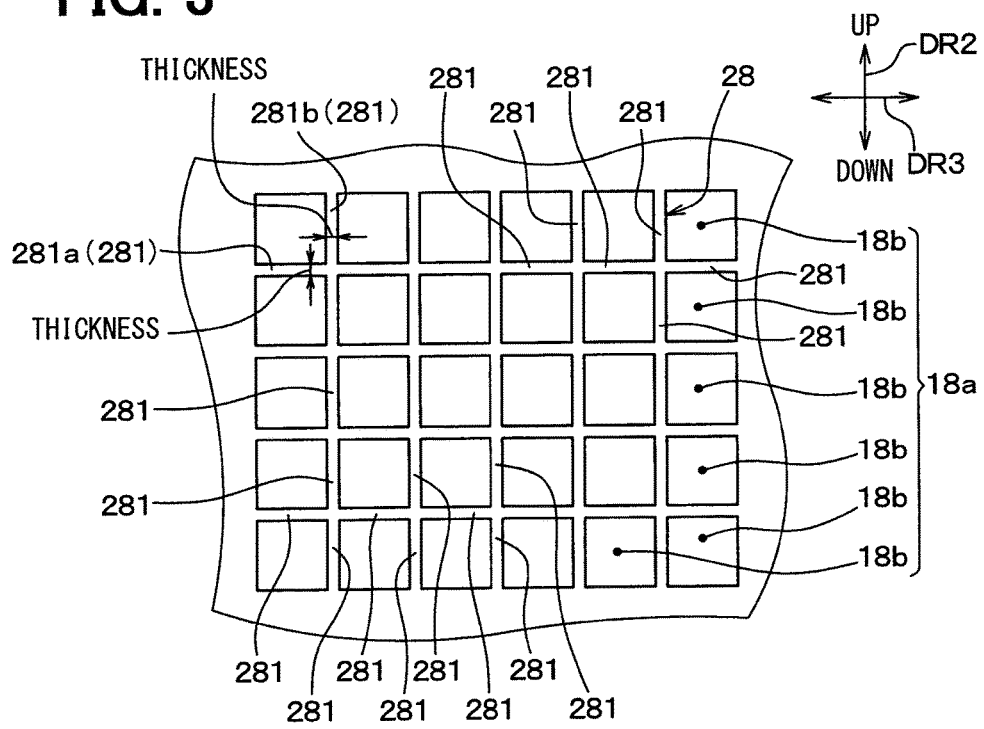
FIG. 3 is a diagram viewed along an arrow III of FIG. 2.

Since the hot air passage 18 is opened and closed by the air mix door 14 on the downstream side of the heater core 15 as described above, the upstream side of the hot air passage 18 in regard to the heater core 15 that is the opposite side from the side opened and closed keeps being open. That is, as shown in FIGS. 2 and 3, the hot air passage 18 includes an opening hole 18a that is an opening end of the hot air passage 18 on the upstream side of the heater core 15. FIG. 2 is a partially enlarged diagram illustrating II part of FIG. 1, and FIG. 3 is a diagram viewed in a direction along an arrow III shown in FIG. 2.

The air-conditioning unit 10 includes a hole separation portion 28 defining the opening hole 18a of the hot air passage 18. Since the opening hole 18a is located upstream of the heater core 15 in regard to the airflow, the hole separation portion 28 is also located upstream of the heater core 15 in regard to the airflow. The hole separation portion 28 is formed in a grid shape as shown in FIG. 3, and the hole separation portion 28 divides the opening hole 18a of the hot air passage 18 into multiple separation holes 18b. In short, the opening hole 18a of the hot air passage 18 is not single through-hole but a concentration of all of multiple separation holes 18b.

In detail, the hole separation portion 28 includes multiple plate portions 281 having plate shapes like strips of paper, for example, and the hole separation portion 28 is formed by connecting multiple plate portions 281 to each other. Specifically, multiple plate portions 281 are connected to each other and arranged such that the hole separation portion 28 has a grid shape. As a whole, the hole separation portion 28 is provided so as to two-dimensionally extend in a direction that intersects with the airflow passing through the opening hole 18a, i.e. the up-down direction DR2 of the vehicle and the width direction DR3 of the vehicle.

Each plate portion 281 is disposed such that its thickness direction intersects with an airflow direction DRf (refer to FIG. 2) of the air passing through the opening hole 18a. Specifically, the airflow direction DRf is parallel to the front-rear direction DR1, and the thickness direction of the plate portion 281 perpendicular to the airflow direction DRf. For example, the thickness direction of a first plate portion 281a of multiple plate portions 281 extending in the width direction DR2 of the vehicle is the up-down direction DR2 of the vehicle, and the thickness direction of a second plate portion 281b extending in the up-down direction DR2 is the width direction DR3 of the vehicle.

Each separation hole 18b is surrounded by some of multiple plate portions 281, respectively. For example, the separation hole 18b is enclosed by four plate portions 281, and the four plate portions 281 are lines of the separation hole 18b having a rectangular shape, excepting the separation hole 18b positioned in a rim portion of the opening hole 18a.

The hole separation portion 28 is made of the same material as the air-conditioning case 11. Specifically, the hole separation portion 28 is integrated with one of multiple case forming member 111, i.e. the hole separation portion 28 is integrated with the case forming member 111 that is at least a part of the air-conditioning case 11. In short, the hole separation portion 28 is integrated with the air-conditioning case 11.

As described above, in the present embodiment, the air mix door 14 opens and closes the hot air passage 18, in which the heater core 15 is disposed, on the downstream side of the heater core 15 in regard to the airflow. The hot air passage 18 has the opening hole 18a that is the opening end of the hot air passage 18 on the upstream side of the heater core 15 in regard to the airflow, the upstream side being the opposite side of the side on which the air mix door 14 is opened and closed. The air-conditioning case 11 includes the hole separation portion 28 dividing the opening hole 18a of the hot air passage 18 into multiple separation holes 18b. According to this, the air bypassing the hot air passage 18 is unlikely to enter the hot air passage 18 through the opening hole 18a in comparison with a case where the opening hole 18a is single hole. Accordingly, a reheat caused by the heater core 15 can be reduced by a simple configuration.

Figure 4:
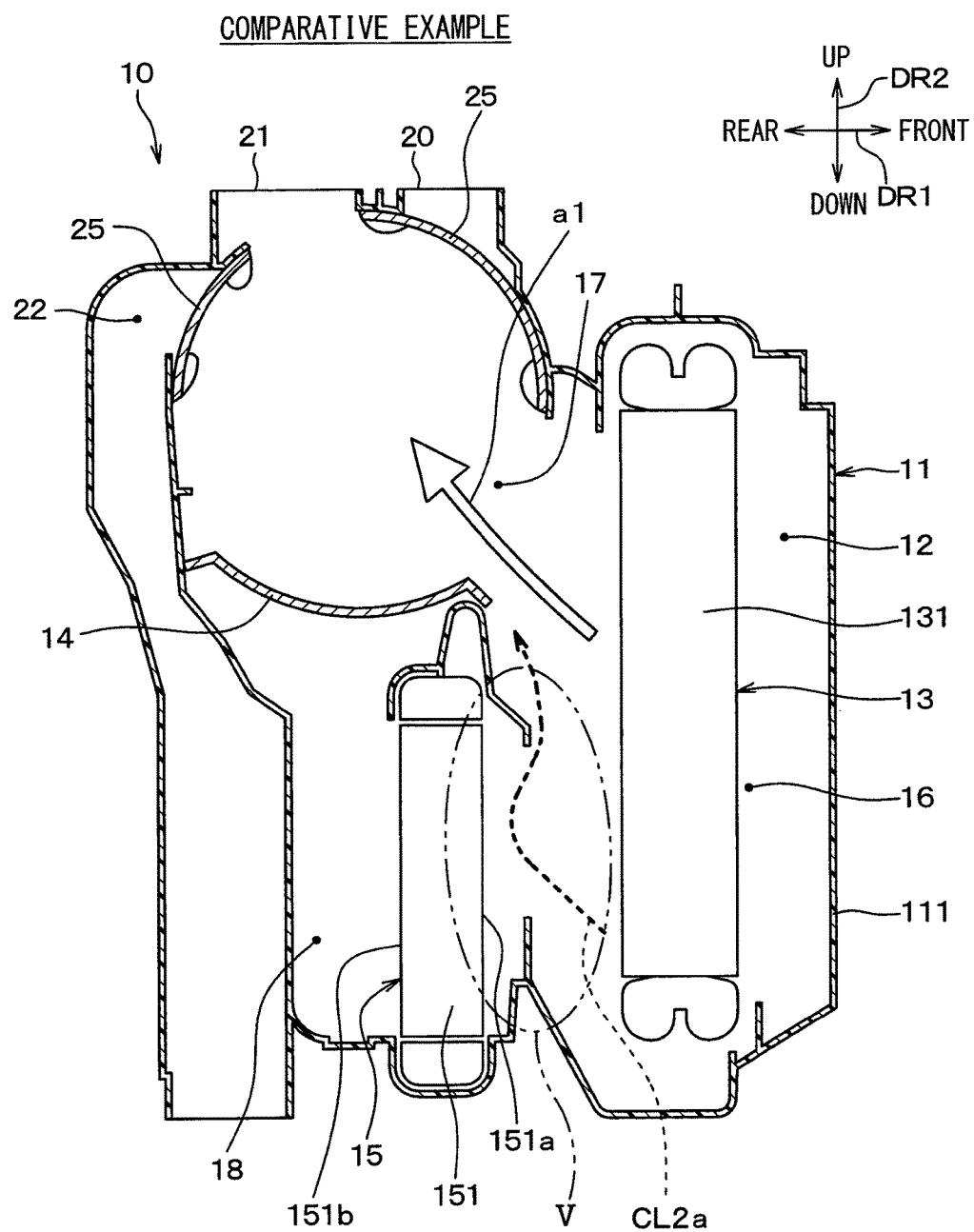
FIG. 4 is a longitudinal section illustrating an air-conditioning unit according to a comparative example of the present disclosure.
Figure 5:
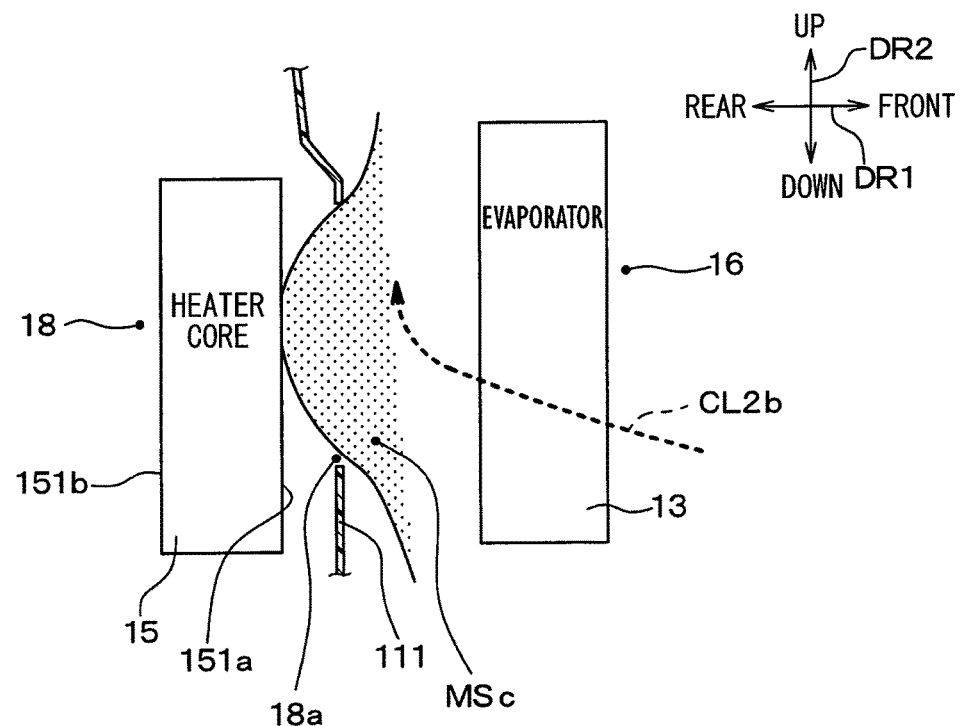
FIG. 5 is a sectional diagram illustrating V part of FIG. 4.

This will be described referring to a comparative example shown in FIGS. 4 and 5. The comparative example is an air-conditioning unit 10, in which the hole separation portion 28 is not provided and the opening hole 18a of the hot air passage 18 is single hole. FIG. 4 is a longitudinal section illustrating the air-conditioning unit 10 according to the comparative example, and FIG. 4 is comparable to FIG. 1 of the first embodiment. FIG. 5 is a partially enlarged diagram illustrating V part of FIG. 4, and FIG. 5 is comparable to FIG. 2 of the first embodiment.

As shown in FIGS. 4 and 5, in the air-conditioning unit 10 of the comparative example, when the air mix door 14 is at the max cool position, the hot air passage 18 is fully closed on the downstream side of the hot air passage 18, and accordingly the air that is a cool air passing through the evaporator 13 flows from the upstream passage 16 to the cool air passage 17. At this time, since no obstacles is provided at the opening hole 18a located between the evaporator 13 and the heater core 15, and since the opening area of the opening hole 18a is large, a part of the cool air flowing from the evaporator 13 flows along the air inflow surface 151a of the heater core 15 as indicated by arrows CL2a and CL2b. Accordingly, a mass of the cool air MSc reaches the heater core 15 from a center part of the opening hole 18a as shown in FIG. 5, and the cool air is heated on the air inflow surface 151a of the heater core 15. According to this, the reheat occurs, in which the cool air is heated by the heat of the heater core 15.

In contrast, the air-conditioning unit 10 of the present embodiment includes the hole separation portion 28 as show in FIGS. 1 and 2, and the opening hole 18a is divided into multiple separation holes 18b by the hole separation portion 28. Therefore, in the air-conditioning unit 10 of the present embodiment, since the opening area of each hole is not total of the opening hole 18a but an opening area of the separation hole 18b, the opening area of the respective hole is remarkably smaller than that of the comparative example. Accordingly, when the air mix door 14 is at the max cool position, a part of the cool air flowing out from the evaporator 13 flows upstream the hole separation portion 28 as indicated by arrows CL1a and CL1b, and the mass of the cool air MSc is unlikely to reach the heater core 15 through the separation hole 18b as shown in FIG. 2. For example, a mountain of the mass of the cool air MSc shown in FIG. 5 is large, and a mountain of the mass of the cool air MSc of the present embodiment shown in FIG. 2 is divided and smaller than that of the mountain shown in FIG. 5. Accordingly, the cool air flowing to the cool air passage 17 can be unlikely to be effected by the heat of the heater core 15, and the reheat caused by the heater core 15 can be limited.

According to the present embodiment, since the hole separation portion 28 can be provided without largely decreasing the total area of the opening area of multiple separation hole 18b in comparison to a case where the opening hole 18a is single hole as in the comparative example, enough amount of the air can easily flow to the heater core 15.

While a resistance to the air flowing may increase by providing the hole separation portion 28, a pressure drop of the air caused by the resistance of the hole separation portion 28 can be remarkably made small compared to a pressure drop of the air caused by the heater core 15, and accordingly a decrease of flow rate caused by providing the hole separation portion 28 can be easily avoided. Moreover, it is a benefit that a shape of the hole separation portion 28 can be chosen highly freely.

In the air-conditioning unit 10 of the present embodiment, since the cool air is prevented from reaching the heater core 15 by partitioning the opening hole 18a located at an entrance of the hot air passage 18, a reheat limiting technology by the hole separation portion 28 of the present embodiment is effective in any layout of the air-conditioning unit 10 having the heater core 15. In other words, the reheat limiting technology by the hole separation portion 28 of the present embodiment is capable of being suitably changed easily even when a shape of the air-conditioning case 11 or the layout of the heat exchangers 13, 15 in the air-conditioning case 11 is changed, and the technology is unlikely to limit a degree of freedom in design of the air-conditioning unit 10. For example, even when the evaporator 13 is positioned to be adjacent to the heater core 15, and accordingly an opening/closing door structure of Patent Document 1 is difficult to be provided on the upstream side of the heater core 15 in regard to the airflow, it is likely to be able to position the hole separation portion 28 of the present embodiment on the upstream side of the heater core 15 in regard to the airflow.

According to the present embodiment, since the hole separation portion 28 having a grid shape located upstream of the heater core 15 in regard to the airflow, water from the evaporator 13 can be prevented from attaching to the heater core 15, and a foreign material can be prevented from entering the heater core 15, and accordingly a life durability of the heater core 15 can be elongated by limiting a corrosion caused by the water or the foreign material. The hole separation portion 28 can be provided so as to have other functions such as a function to arrange the air flowing into the hot air passage 18 to improve the performance, a function to adjust a direction of the inflow air, or a function to prevent water from attaching the heater core 15.

According to the present embodiment, multiple plate portions 281 included in the hole separation portion 28 defines the hole separation portion 28 by being connected to each other and are arranged respectively such that the thickness direction of the plate portion 281 intersects with the airflow direction DRf (refer to FIG. 2) of the air passing through the opening hole 18a. Each separation hole 18b is surrounded and defined by some of multiple plate portions 281. Accordingly, it is a benefit that the resistance to the air by the hole separation portion 28 can be easily set such that the cool air flowing from the evaporator 13 to the cool air passage 17 does not reach the heater core 15 when the air mix door 14 is at the max cool position.

Since multiple plate portions 281 are provided, and since the hole separation portion 28 is positioned upstream of the heater core 15, the air passing through the opening hole 18a and flowing into the hot air passage 18 can be oriented. For example, the airflow can be guided such that the heater core 15 is capable of heating the air when the hot air passage 18 is opened.

According to the present embodiment, since the hole separation portion 28 is integrated with the case forming member 111 that forms a part of the air-conditioning case 11, the hole separation portion 28 can be provided without increasing the number of components, and the hole separation portion 28 is capable of limiting the reheat caused by the heater core 15. That is, the reheat limiting technology meeting a requirement of cost and quality can be provided.

According to the above-described configurations, the air mix door 14 opens and closes the hot air passage 18, in which the heater core 15 is provided, on one of the upstream side and the downstream side of the heater core 15, and the hot air passage 18 has the opening hole that is the opening end of the hot air passage 18 on the other of the upstream side and the downstream side of the heater core 15. Since the air-conditioning case 11 has the hole separation portion 28 dividing the opening hole 18a of the hot air passage 18 into multiple separation holes 18b, the air bypassing the hot air passage 18 is unlikely to enter the hot air passage 18 through the opening hole 18a compared to a case where the opening hole 18a is single hole. Accordingly, a reheat by the heater core 15 can be limited with a simple structure.

Second Embodiment

Next, a second embodiment of the present disclosure will be described. In the present embodiment, different points from the above-described first embodiment will be mainly described. Descriptions of the elements identical with or equivalent to the above-described embodiment will be omitted or simplified. This is the same as a third embodiment described below.

Figure 6:
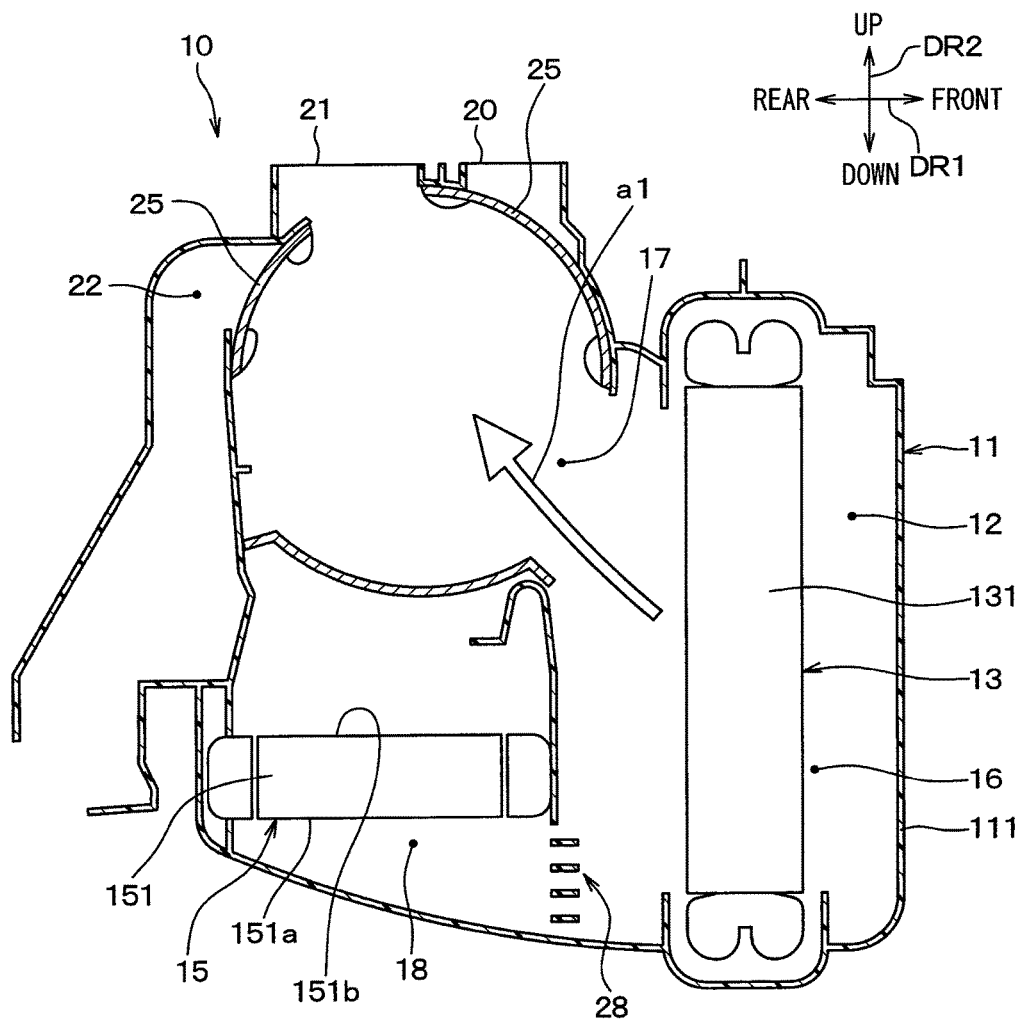
FIG. 6 is a longitudinal section illustrating an air-conditioning unit according to a second embodiment of the present disclosure.

FIG. 6 is a longitudinal section illustrating an air-conditioning unit 10 of the present embodiment, and FIG. 6 is comparable to FIG. 1 of the first embodiment. As shown in FIG. 6, an arrangement of a heater core 15 is different from that of the first embodiment. Specifically, the heater core 15 of the first embodiment is longitudinally provide, however, the heater core 15 of the present embodiment is horizontally arranged such that an air inflow surface 151*a* and an air outflow surface 151*b* extend two-dimensionally in a horizontal direction of a vehicle.

In contrast, the hole separation portion 28 of the present embodiment is provided, as a whole, so as to extend in a direction intersecting with an airflow passing through the opening hole 18*a* (refer to FIG. 3), i.e. an up-down direction DR2 and a width direction DR3 of the vehicle. Accordingly, regarding a relative positional relationship between the heater core 15 and the hole separation portion 28 of the present embodiment, the heater core 15 is placed such that the air inflow surface 151*a* is angled to the hole separation portion 28. In FIG. 6, for example, the air inflow surface 151*a* is provided at a right angle to the hole separation portion 28. The heater core 15 may be arranged such that the air inflow surface 151*a* is angled to the up-down direction DR2 of the vehicle.

In the present embodiment, effects derived from the configurations identical with the above-described first embodiment can be obtained similarly to the first embodiment. Moreover, according to the present embodiment, the heater core 15 is placed such that the air inflow surface 151*a* is angled to the hole separation portion 28. Accordingly, most part of the heater core 15 is farther from the hole separation portion 28 compared to the first embodiment in which the hole separation portion 28 extends parallelly to the air inflow surface 151*a* of the heater core 15, and the effect to limit the reheat caused by the heater core 15 can be more effective.

Third Embodiment

Next, a third embodiment of the present disclosure will be described. In the present embodiment, different points from the above-described first embodiment will be mainly described.

Figure 7:
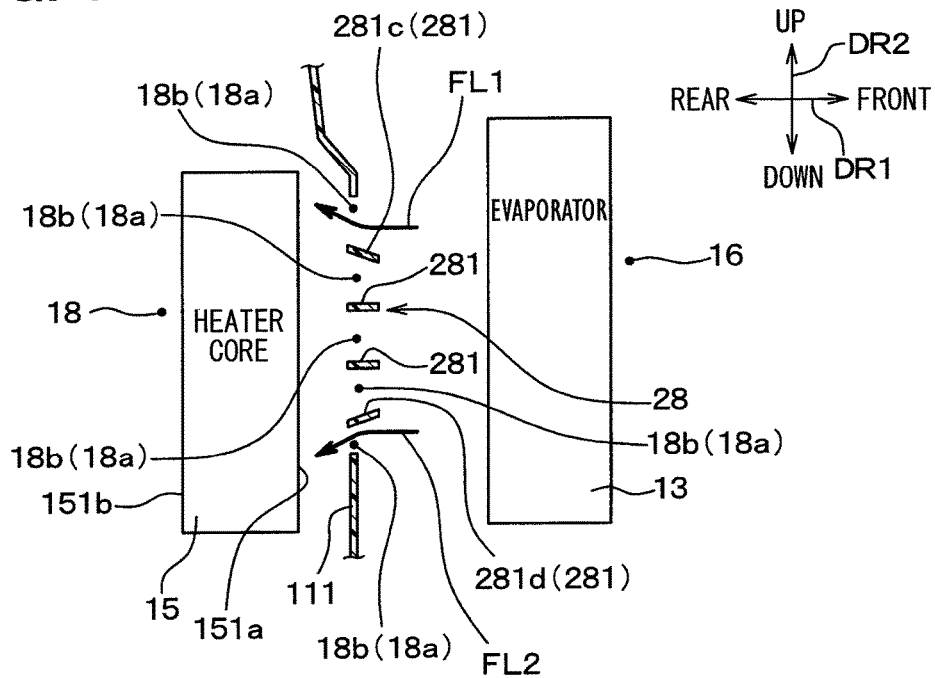
FIG. 7 is a sectional diagram illustrating a part of a vehicle air-conditioning unit according to a third embodiment of the present disclosure.

FIG. 7 is a partially enlarged diagram of the present embodiment illustrating II part of FIG. 1, and FIG. 7 is comparable to FIG. 2 of the first embodiment. As shown in FIG. 7, in the present embodiment, some of multiple plate portions 281 included in the hole separation portion 28 are provided in a different way than the first embodiment.

Specifically, some of multiple plate portions 281 that are plate portions 281*c*, 281*d* positioned on both ends in an up-down direction DR2 of a vehicle are provided along a direction such that an air passing through the opening hole 18*a* is blown to spread from the opening hole 18*a*. At least some of the separation holes 18*b* may have an area on a downstream end larger than that on an upstream end.

In detail, an upper side plate portion 281*c* positioned in an upper end of multiple plate portions 281 included in the hole separation portion 28 in the up-down direction DR2 of the vehicle is provided along a direction in which an air flowing along the upper side plate portion 281*c* is blown obliquely upward from a separation hole 18*b* as indicated by an arrow FL1. A lower side plate portion 281*d* positioned in a lower end in the up-down direction DR2 of the vehicle is provided along a direction in which an air flowing along the lower side plate portion 281*d* is blown obliquely downward from the separation hole 18*b* as indicated by an arrow FL2. An area of the opening hole 18*a* of a hot air passage 18 viewed in an airflow direction is smaller than that of an air inflow surface 151*a* of the heater core 15 similarly to the first embodiment.

In the present embodiment, effects derived from the configurations identical with the above-described first embodiment can be obtained similarly to the first embodiment. Moreover, according to the present embodiment, the plate portions 281*c*, 281*d* of multiple plate portions 281 are provided along a direction such that the air passing through the opening hole 18*a* is blown to spread from the opening hole 18*a*. Accordingly, an effect can be derived from a function of the hole separation portion 28 for adjusting a direction of the inflow air, the effect limiting nonuniformity of the air flowing into the heater core 15 to flow the air into the heater core 15 uniformly.

Moreover, a benefit to flow the air to a part of the heater core 15 that is screened by a rib located near the opening hole 18*a* can be obtained, and accordingly a heating ability can be improved and the flow rate can increase.

The present embodiment is an example of a modification based on the first embodiment, but the present embodiment can be combined with the above-described second embodiment.

Fourth Embodiment

Next, a fourth embodiment of the present disclosure will be described. In the present embodiment, different points from the above-described first embodiment will be mainly described.

Figure 8:
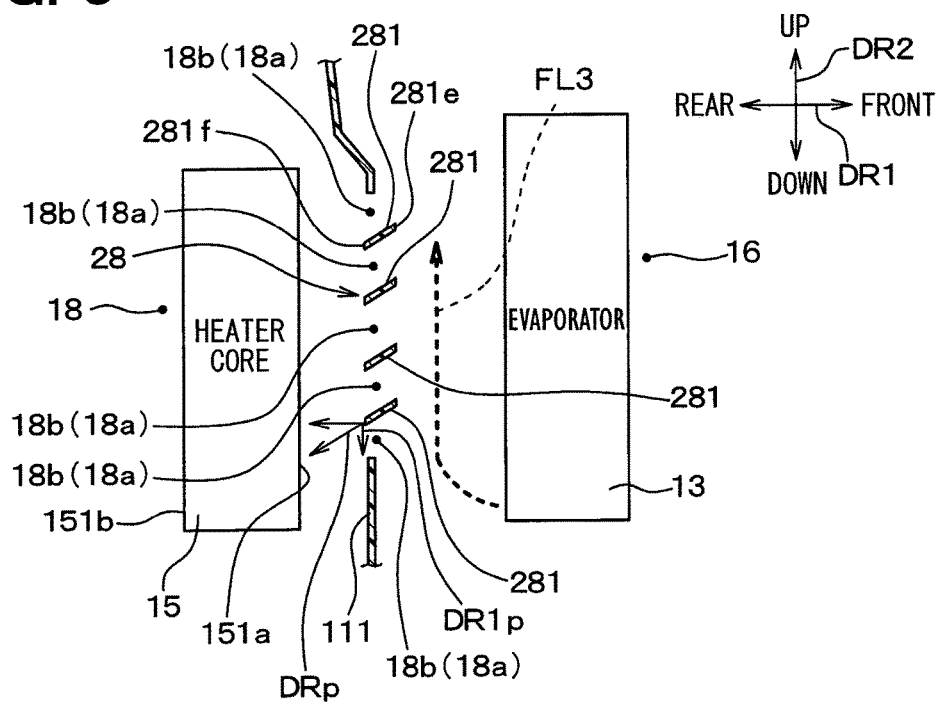
FIG. 8 is a sectional diagram illustrating a part of a vehicle air-conditioning unit according to a fourth embodiment of the present disclosure.

FIG. 8 is a partially enlarged diagram of the present embodiment illustrating II part of FIG. 1, and FIG. 7 is comparable to FIG. 2 of the first embodiment. As shown in FIG. 8, in the present embodiment, multiple plate portions 281 included in a hole separation portion 28 is provided in a different way than the first embodiment.

Specifically, in FIG. 8, a direction DRp from an upstream end 281*e* of the plate portion 281 toward a downstream end of the plate portion 281 is indicated by an arrow DRp. For example, the direction DRp of the plate portion 281 is angled to a front-rear direction DR1 of a vehicle such that the upstream end 281*e* of the plate portion 281 is positioned in an upper part compared to the downstream end 281*f*, and the plate portions 281 are parallel to each other. Moreover, since an entrance of a cool air passage 17 (refer to FIG. 1) is positioned in an upper part compared to the hole separation portion 28, an airflow FL3 from an upstream passage 16 toward the cool air passage 17 occurs in an upstream side of hole separation portion 28 when a hot air passage 18 is closed by an air mix door 14. The airflow FL3 flows upward.

Accordingly, the direction DRp of the above-described plate portion 281 has a direction component DR1*p* opposite to the airflow FL3 flowing from the upstream passage 16 toward the cool air passage 17 on an upstream side of the hole separation portion 28 when the hot air passage 18 is closed by the air mix door 14, and the direction DRp is angled to the airflow FL3. Each of multiple plate portions 281 are provided along such direction.

Accordingly, entering of an cool air from an evaporator 13 into the hot air passage 18 through the hole separation hole 18*b* can be strongly limited when the hot air passage 18 is closed by the air mix door 14 compared to the plate portion 281 provided as described in the first embodiment. In the present embodiment, all of the above-described directions DRp of multiple plate portions 281 have the direction component DR1*p*, however, the above-described directions DRp of not all but some of the plate portions 281 may have the above-described direction component DR1*p*.

In the present embodiment, effects derived from the configurations identical with the above-described first embodiment can be obtained similarly to the first embodiment. The present embodiment is an example of a modification based on the first embodiment, but the present embodiment can be combined with the above-described second embodiment.

Fifth Embodiment

Next, a fifth embodiment of the present disclosure will be described. In the present embodiment, different points from the above-described first embodiment will be mainly described.

Figure 9:
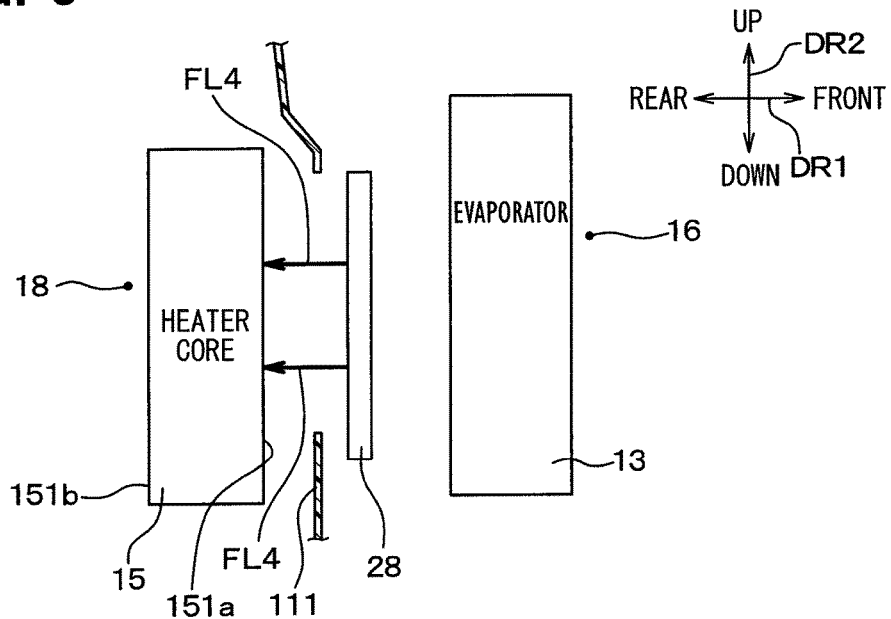
FIG. 9 is a sectional diagram illustrating a part of a vehicle air-conditioning unit according to a fifth embodiment of the present disclosure.

FIG. 9 is a partially enlarged diagram of the present embodiment illustrating II part of FIG. 1, and FIG. 9 is comparable to FIG. 2 of the first embodiment. As shown in FIG. 9, in the present embodiment, a hole separation portion 28 is provided in a different way than the first embodiment.

Specifically, the hole separation portion 28 of the present embodiment is provided as a member separated from a case forming member 111. The hole separation portion 28 is fixed to an air-conditioning case 11 by screwing, for example. The hole separation portion 28 is formed of a hole forming member in which multiple separation holes 18b that are vents are provided. The hole forming member may be a metal mesh, a resin net, or a plate portion that has multiple honeycomb holes and its thickness direction is an axial direction of the honeycomb hole.

When a hot air passage 18 is opened, an air flowing from an upstream passage 16 toward the hot air passage 18 passes through the hole separation portion 28 formed of the hole forming member and flows into the hot air passage 18 as indicated by an arrow FL4.

In the present embodiment, effects derived from the configurations identical with the above-described first embodiment can be obtained similarly to the first embodiment. The present embodiment is a modification based on the first embodiment, but the present embodiment can be combined with the above-described second to fourth embodiments.

The present disclosure is not limited to the above-described embodiments, and such changes and modifications described below are to be understood as being within the scope of the present disclosure.

(1) In the above-described embodiments, the air mix door 14 opens and closes the hot air passage 18 on the downstream side of the heater core 15 in regard to the airflow, however, the air mix door 14 may open and close the hot air passage 18 on the upstream side of the heater core 15 in regard to the airflow. When the hot air passage 18 is opened and closed on the upstream side of the heater core 15 in regard to the airflow, the hole separation portion 28 and the opening hole 18a defined by the hole separation portion 28 are located downstream of the heater core 15. Namely, the air mix door 14 opens and closes the hot air passage 18 on one of the upstream side and the downstream side of the heater core 15, and the hole separation portion 28 and the opening hole 18a are provided on the other one of the upstream side and the downstream side of the heater core 15.

(2) In the above-described embodiments, the air-conditioning case 11 is formed by integrating multiple case forming members 111, however, the air-conditioning case 11 may be formed from single case forming member 111. The case forming member 111 integrated with the hole separation portion 28 may form at least a part of the air-conditioning case 11.

(3) In the above-described third embodiment, the plate portions provided along the direction such that the air passing through the opening hole 18a is blown to spread from the opening hole 18a are the plate portions 281c, 281d that are a part of multiple plate portions 281 included in the hole separation portion 28, however, all of multiple plate portion 281 may be such plate portions.

Figure 10:
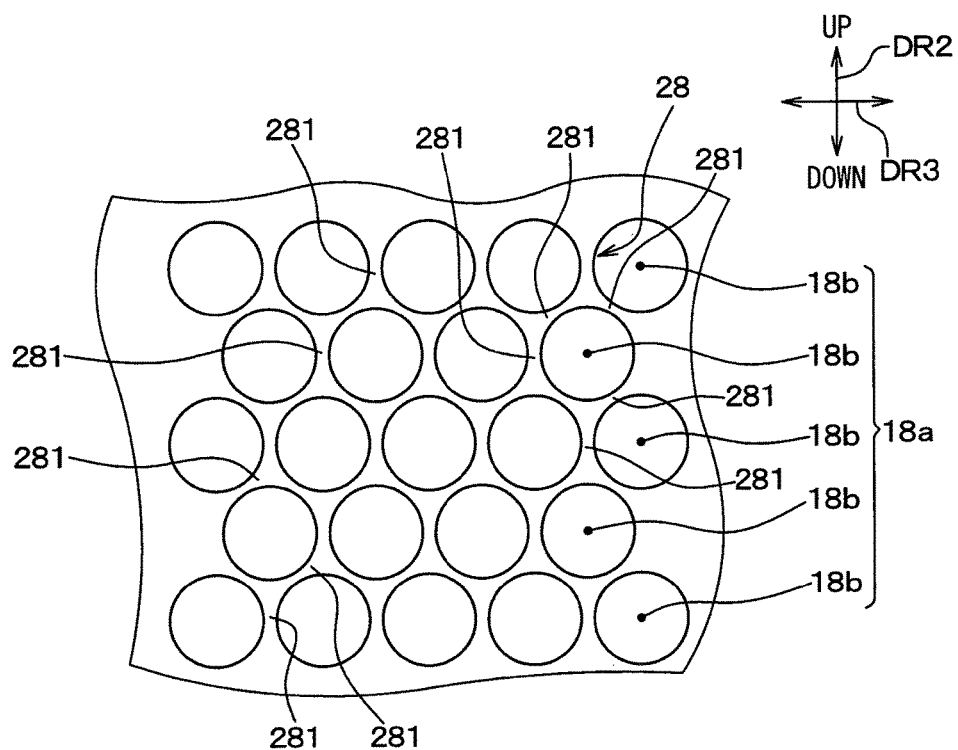
FIG. 10 is a diagram according to a modification of the first embodiment viewed along the arrow III of FIG. 2 and is comparative with FIG. 3.

(4) In the above-described first embodiment, each of multiple separation holes 18b has a rectangular shape when viewed in the flow direction of the air passing through the opening hole 18a, however, the shape is not limited and may be a circular shape as shown in FIG. 10, for example. FIG. 10 is a diagram of a modification of the first embodiment viewed in a direction along an arrow III shown in FIG. 2, and comparable to FIG. 3 of the first embodiment. In the modification shown in FIG. 10, since the separation hole 18b has a circular shape, a thickness of the plate portion 281 encircling the separation hole 18b is not uniform, however, a point where multiple plate portions 281 forms the hole separation portion 28 by being combined with each other is identical with the first embodiment.

(5) In the above-described embodiments, the evaporator 13 is disposed in the upstream passage 16, however, the evaporator 13 may not be provided, and an outside air may be introduced to the upstream passage 16 to flow into one or both of the cool air passage 17 and the hot air passage 18.

(6) In the above-described embodiments, the air mix door 14 opens and closes the cool air passage 17 as well as the hot air passage 18, however, the air mix door 14 may not have the function to open and close the cool air passage 17. For example, the cool air passage 17 may be opened and closed by an open/close device other than the air mix door 14.

(7) In the above-described embodiments, both the air mix door 14 and the air blowing mode door 25 are rotary type doors, but the door type is not limited. For example, the air mix door 14 and the air blowing mode door 25 may be doors having a flat plate shape.

The present disclosure is not limited to the above-described embodiments and may be modified. The above-described embodiments are not irrelevant to each other and can be combined suitably except for a case where it is obviously impossible to combine. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

What is claimed is:
1. A vehicle air-conditioning unit comprising:
an air-conditioning case including
a first air passage,
a second air passage connected to the first air passage, an air flowing from the first air passage to the second air passage, and
a third air passage connected to the first air passage in parallel with the second air passage, the air flowing from the first air passage to the third air passage, a downstream end of the third air passage being joined together with the second air passage;

a heater provided in the third air passage and heating the air flowing in the third air passage; and an air mix door located downstream of the heater in the airflow, the air mix door opening and closing the third air passage, wherein the third air passage includes an opening hole that is an upstream end of the third air passage, the air-conditioning case includes a hole separation portion dividing the opening hole of the third air passage into a plurality of separation holes, the hole separation portion is located upstream of the heater in the airflow, the hole separation portion includes a plurality of plate portions having plate shapes, the plurality of plate portions are connected to each other to form the hole separation portion and are arranged such that a thickness direction of each plate portion of the plurality of plate portions intersects with a direction of the air passing through the opening hole, each separation hole of the plurality of separation holes is defined and surrounded by some of the plurality of plate portions, each plate portion of the plurality of plate portions has an upstream edge and a downstream edge, and at least some plate portions of the plurality of plate portions are inclined away from the second air passage from the upstream edge to the downstream edge, the some plate portions of the plurality of plate portions extending in parallel with each other.

2. The vehicle air-conditioning unit according to claim 1, wherein the hole separation portion has a grid shape.

3. The vehicle air-conditioning unit according to claim 1, wherein the hole separation portion extends in a direction intersecting the airflow passing through the opening hole, and the heater has an air inflow surface into which the air flows and is arranged such that the air inflow surface is angled to the hole separation portion.

4. The vehicle air-conditioning unit according to claim 1, further comprising a cooler provided in the first air passage to cool the air flowing in the first air passage.

5. The vehicle air-conditioning unit according to claim 1, wherein the hole separation portion is integrated with a case forming member forming at least a part of the air-conditioning case.

6. The vehicle air-conditioning unit according to claim 1, wherein at least some separation holes of the plurality of separation holes has an area on a downstream end larger than that on an upstream end.

7. A vehicle air-conditioning unit comprising:

an air-conditioning case including
a first air passage,
a second air passage connected to the first air passage, an air flowing from the first air passage to the second air passage, and
a third air passage connected to the first air passage in parallel with the second air passage, the air flowing from the first air passage to the third air passage, a downstream end of the third air passage being joined together with the second air passage;

a heater provided in the third air passage and heating the air flowing in the third air passage; and an air mix door located downstream of the heater in the airflow, the air mix door opening and closing the third air passage, wherein the third air passage includes an opening hole that is an upstream end of the third air passage, the air-conditioning case includes a hole separation portion dividing the opening hole of the third air passage into a plurality of separation holes, the hole separation portion is located at the opening hole of the third air passage, and the hole separation portion is a plate member that has a plurality of through-holes extending through the hole separation portion in a thickness direction of the hole separation portion.

* * * * *